C. R. JESSE & R. T. WARE.
VEHICLE.
APPLICATION FILED AUG. 27, 1907.

899,989.

Patented Sept. 29, 1908.
3 SHEETS—SHEET 3.

Witnesses
F. L. Ourand
Watts T. Estabrook

Inventors.
C. R. Jesse
R. T. Ware.
By
Louis Bagger & Co
Attorneys

UNITED STATES PATENT OFFICE.

CAMDEN R. JESSE AND RICHARD T. WARE, OF OWENSBORO, KENTUCKY, ASSIGNORS TO OWENSBORO WAGON CO. INC., OF OWENSBORO, KENTUCKY.

VEHICLE.

No. 899,989.      Specification of Letters Patent.      Patented Sept. 29, 1908.

Application filed August 27, 1907. Serial No. 390,272.

*To all whom it may concern:*

Be it known that we, CAMDEN RILEY JESSE and RICHARD TUCKER WARE, citizens of the United States, residing at Owensboro, in the county of Daviess and State of Kentucky, have invented certain new and useful Improvements in Vehicles, of which the following is a specification.

Our invention relates to improvements in wagons, particularly of the eight-wheel type. Its objects are, among other things, to add strength and enduring or lasting qualities to the vehicle; to facilitate the turning of the latter and to effect the same in the minimum compass or space; to retain the parts in their relatively effective or working position and to provide for effecting the mutual bracing of the parts; and to carry out these ends in a simple, economic and expeditious manner.

Said invention consists of certain instrumentalities or features substantially as hereinafter fully disclosed and pointed out by the claims.

Figure 1:
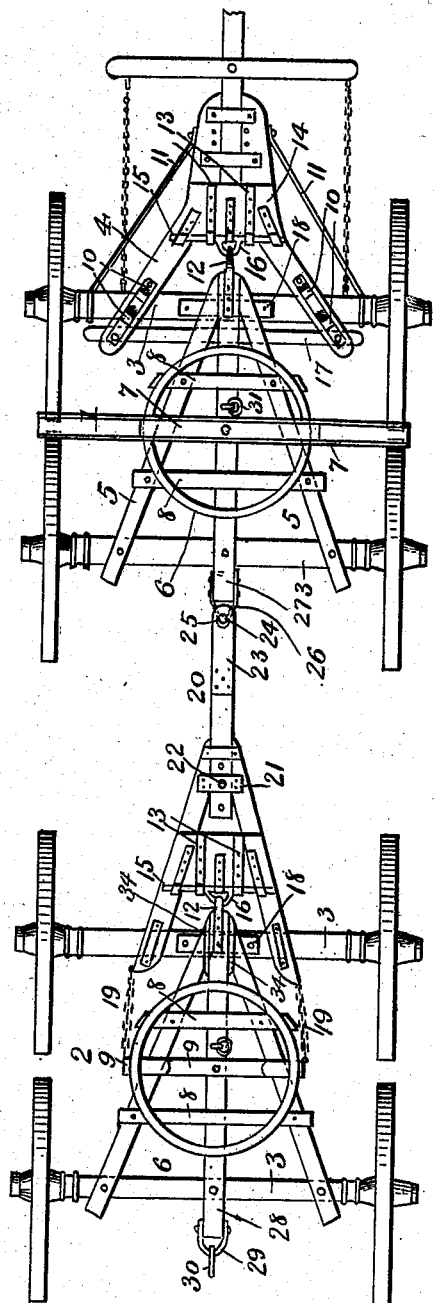
Figure 2:
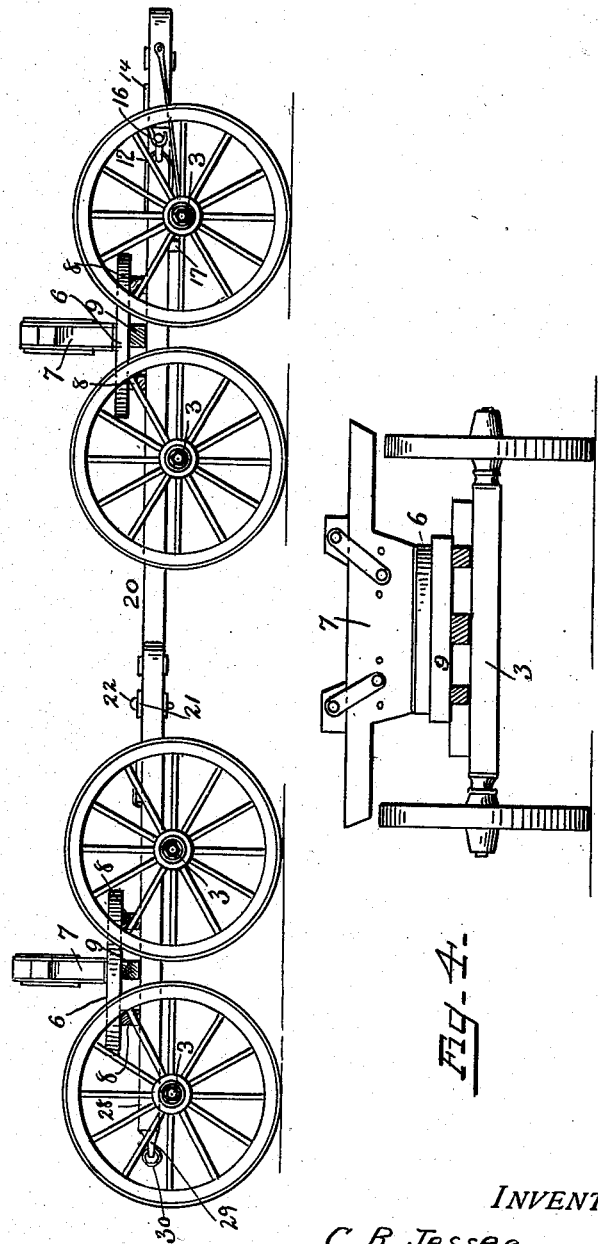
Figure 3:
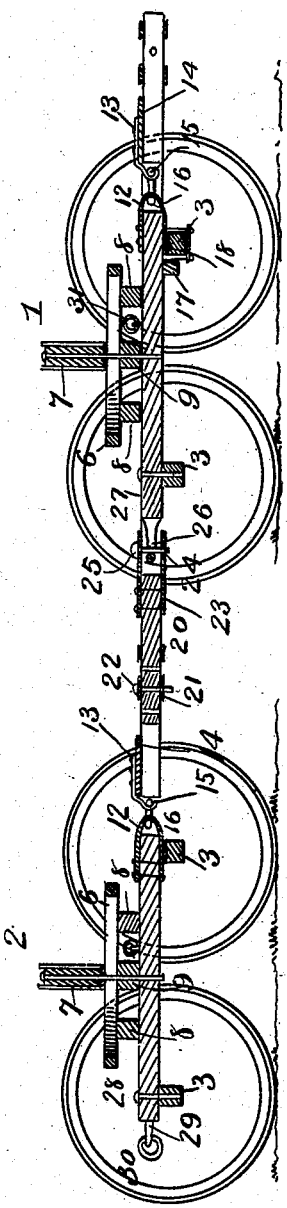

In the accompanying drawing illustrating the preferred embodiment of our invention—Figure 1 is a plain view thereof. Fig. 2 is a side view of the same. Fig 3 is a vertical longitudinal section thereof. Fig. 4 is a vertical transverse section taken through the forward running gear, just alongside of the bolster thereof.

In the disclosure of our invention, we employ a forward truck or running gear 1 and a rear truck or running gear 2, each comprising generally two pairs of axles 3, equipped with the usual pairs of wheels; forward and rear hounds 4, 5, respectively; a circle or fifth wheel 6, and a bolster 7 all being common to each running gear or truck, and each of the hounds embracing the usual superposed cross bars 8 and sand bar 9 upon which are mounted the circle or fifth-wheel and the bolster. The forward hounds of the forward truck are adapted for the reception and retention of the inner end of the draft-bar or tongue between the members thereof in the usual way, and said hounds have their said members firmly bolted or clipped near their rear ends to the forward axle-member as at 10 and are also braced in position forward of said axle-member by means of stout rods or bars 11 suitably secured at their forward ends to said hounds-members and at their rear ends to said axle-member preferably as disclosed in Figs. 1 and 2.

The rear hound 5 of the rear truck where it is brought together at the forward end and mounted on the forward axle of the rear truck is preferably widened as at 34. The bolsters 7 upon the hounds extend out over the wheels to the outer edge of the tire. The rear hounds 5 of each truck or running gear have suitably bolted to, and projecting beyond the forward end thereof a staple-like loop or clip 12, and the forward hounds have suitably strapped pivotally, as at 13, to an intermediate part 14 thereof a rock shaft or rod 15 having an integral central loop-formation 16 standing at right-angles to, and swiveled or loosely connected to the aforesaid loop or clip 12. This arrangement provides for dispensing with the usual king-bolt and for articulating or pivotally connecting together said forward and rear trucks or running gears, whereby they may have a limited lateral and vertical independent movement of each other for the requisite mobility or freedom of movement between the trucks as conditions of travel may require for the easy movement of the parts and for lessening the stress upon, and preventing the pounding of the horses by the tongue or draft bar. It will also be noted that the forward end of the rear hounds are caused to overlie and rest upon the forward axle-member; and that to the rear ends of the forward hounds and extending between them is secured or bolted a cross-bar 17, also underlying the forward end of said rear hounds, whereby the weight of the latter will be utilized to uphold the tongue or draft bar thus obviating the horses carrying such weight.

The forward axle-member of each truck is armed with a metal wear-plate 18 upon its upper surface, as is, or may be, the opposed surface of the rear hounds of each truck to take the wear off said axle-member and said hounds, as suggested by the name of said plates. The forward hounds of the rear truck or running gear have the rear ends of the members thereof suitably connected to the bolster of the rear hounds of said rear truck by means of chains 19, or other suitable means, for the retention of said hounds, with said bolster, in relative alinement the purpose of which is obvious.

A reach 20, effecting suitable connection between the two trucks or running gears, is of the general outline shown, with its rear end portion suitably secured in between the members of the forward hounds of the rear truck preferably by means of plates 21 secured crosswise of said reach, to said hounds-members upon their upper and lower surfaces, two of said plates having opposite openings for receiving a coupling pin 22 insertible therethrough and through one or more apertures in said reach thereby providing for the adjustability of this point of connection. Said reach is equipped at its forward end with opposed or parallel plates 23 having, near their extreme forward ends coinciding apertures 24 through which is inserted a pin 25 also insertible through a staple-like loop 26 secured to a central rearwardly extending bar 27 bolted to the rear axle and to the corresponding hounds of the forward truck or running gear, thus providing as aforesaid for coupling together the two trucks. The rear hounds of the rear truck have also secured thereto a central rearwardly extending bar 28 to the rear end of which is also suitably applied a staple-like loop 29 loosely connected with which is a ring 30; also to the corresponding member or bar 27 is loosely applied a like ring 31, through which rings may be passed or inserted a rope or chain or chains for aiding in suitably binding the logs or load upon the wagon. It will be noted that the trucks as thus devised and coupled together are also capable of independent or separate vertical and lateral movement which will allow of the turning of the wagon or vehicle in the minimum compass or space, practically we have found only that required for the ordinary construction of wagon, while the wagon itself is characterized for simplicity, convenience or facility of manipulation and for enduring or lasting qualities.

We claim—

1. A device as described, employing a truck or running gear comprising a forward hounds and a rear hounds, and connecting means between said hounds embracing a rock-shaft journaled in the rear part of said forward hounds and a staple-like loop or clip fixed to the forward end of said rear hounds and loosely connected to an integral loop of said rock-shaft.

2. A device as described, employing two trucks each embracing a forward hounds and a rear hounds pivotally connected together to have vertical and lateral movement, said forward truck having the rear portion of its forward hounds connected together by a cross-bar, and said rear hounds having the forward end thereof overlying said cross-bar, and means pivotally connecting said forward end of said rear hounds to an intermediate part of said forward hounds, and a reach coupling together said trucks and adapted to allow of a vertical and lateral independent movement between said trucks.

In testimony whereof we affix our signatures, in presence of two witnesses.

C. R. JESSE.
R. T. WARE.

Witnesses:
W. A. STEELE,
R. A. CLIFFORD.